2 Sheets—Sheet 1.

J. W. NYSTROM.
CENTRIPETAL PROPELLER.

No. 7,194.  Patented Mar. 19, 1850.

2 Sheets—Sheet 2.

J. W. NYSTROM.
CENTRIPETAL PROPELLER.

No. 7,194.

Patented Mar. 19, 1850.

UNITED STATES PATENT OFFICE.

JOHN W. NYSTROM, OF PHILADELPHIA, PENNSYLVANIA.

CENTRIPETAL PROPELLER.

Specification of Letters Patent No. 7,194, dated March 19, 1850.

*To all whom it may concern:*

Be it known that I, JOHN WILLIAM NYSTROM, late of the city of Stockholm and Kingdom of Sweden, now of the city and county of Philadelphia and State of Pennsylvania, have invented certain new and useful Improvements in Screw-Propellers, of which the following is a full, clear, and exact description, reference being had to the accompanying drawings, which form part of this specification and which represent one of my centripetal propellers, and the manner of laying out the same.

Whereas in screw propellers the water between the blades is acted upon at the same moment by two forces, the one being the propulsive force resulting from the oblique action of the revolving blades, and the other being the centrifugal force generated by their rotation; the first force tending to force the water backward in directions parallel with the axis of the propeller, and the second force tending to force it outward in directions at right angles to the axis. Now my invention consists in counteracting the centrifugal force by the particular curve imparted to the blades of the propeller in such manner that the water instead of being deflected outward is delivered in directions parallel with the axis of the propeller.

Figure 1:
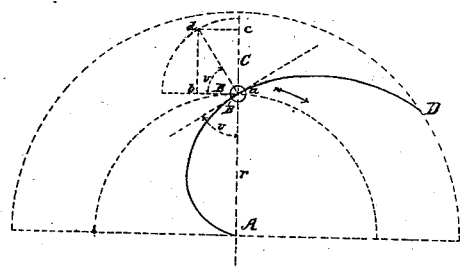

The formulas by which the curvature of the blades is calculated are deduced from those by which the value of the centrifugal force is obtained, in the following manner: Let a body B (Figure 1) revolve (in the direction of the arrow) around a point A at a distance of $r$ feet from that central point, with a velocity of $h$ feet per second, its centrifugal force will then be given by the equation: centrifugal force, or $$C = \frac{Bh^2}{gr} \quad (1)$$

in which equation B denotes the weight of the body, and $g$ the force of gravity, or 32.2 feet.

If the number of revolutions per minute, which may be denoted by the letter $n$, and the radius, $r$, of the propeller be known, the velocity per second or the quantity $h$ in equation 1 is found by the equation $$h = \frac{2r\pi n}{60}; \quad (2)$$

that is to say, by multiplying the number of revolutions per minute by the circumference of the circle described, and dividing the product by the number of seconds (60) in a minute. By substituting this value of $h$ in equation 1 we obtain $$C = \frac{B\frac{4r^2\pi^2 n^2}{60^2}}{gr} = \frac{B4r^2\pi^2 n^2}{gr60^2} = \frac{B4r n^2\pi^2}{g60^2} \quad (3)$$

or the value of the centrifugal force from those of the quantities B, $r$, $n$, $\pi$, and $g$.

Now referring again to Fig. 1 let the line $a\ b$ represent the direction and momentum of the body B under the action of the propulsive force, and $a\ c$ the magnitude and direction of a force equal and opposite to the centrifugal force acting upon it, then by a well known principle of mechanics, the diagonal ($a\ d$) of the parallelogram erected on the two forces as sides will represent the magnitude and direction of the resultant force, which will force the body to describe a circle around the center A with a radius of $r$ feet and with a velocity of $h$ feet per second; if then the blade of the propeller at this distance of $r$ feet from the axis be at right angles to this diagonal line, it will counteract the tendency of the water, which is the body in this instance, to pass outward from the axis under the action of the centrifugal force. The angle $v$ which the blade at this distance from the axis makes with the radius, and which is equal to the angle $d\ a\ b$ which the diagonal of the parallelogram makes with the line $a\ b$ is determined by the trigonometrical equation $$\tan. v = \frac{\sin. v}{\cos. v}$$

In the parallelogram $a\ b\ c\ d$, $ac =$ sin. $v = C$ and $ab =$ cos. $v = B$; hence $$\tan. v = \frac{C}{B}$$

and B tan. $v = C$. Substituting in this equation the value of C given by equation 3, we have, $$B \tan. v = C = \frac{B 4r n^2 \pi^2}{g 60^2}$$

and, $$\tan. v = \frac{4r n^2 \pi^2}{g 60^2}$$

Figure 2:
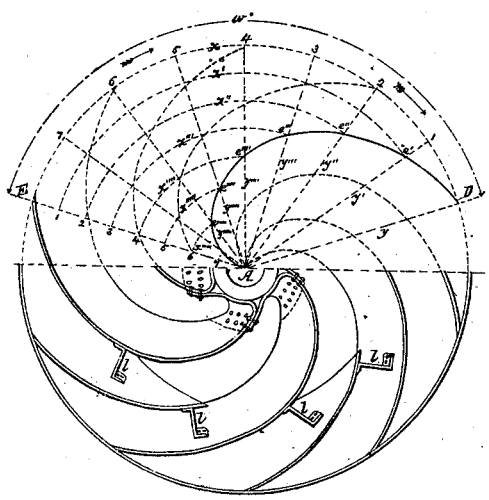

By replacing the symbols $\pi$ and $g$ by their known values; viz: $g = 32.2$, and $\pi = 3.1416$, we have $$\tan. v = \frac{4r n^2}{11740} = \frac{2r n^2}{5870} \quad \text{(Rule 1)} \quad (4)$$

which equation represents a rule for finding the angle $v$ which may be thus expressed in words: Multiply the number of revolutions of the propeller per minute by itself and by the diameter of the circle described in feet; divide the product by 5870, the quotient will be the tangent of the angle which the blade of the propeller should make with the radius at the circumference of the circle described. If the inclination of the blades at various distances from the axis be determined by this rule and if the inclined lines be united, a spiral curve A D Figs. 1 and 2 will be formed, progressively increasing in its inclination to the radii of the propeller as it proceeds from the center to the circumference; and this curve will be contained in the sector of the circle bounded by two radii A D, A E, and the included arc D E or $w°$. In order to save the time required to calculate the inclination of the propeller blade at all the intermediate points between the axis A and the circumference B, I have recourse to the formula of the parabola, whence an equation is obtained, by which when the angle of the blade with the radius at the circumference of the propeller is known, the arc $w°$ can be calculated.

Figure 3:
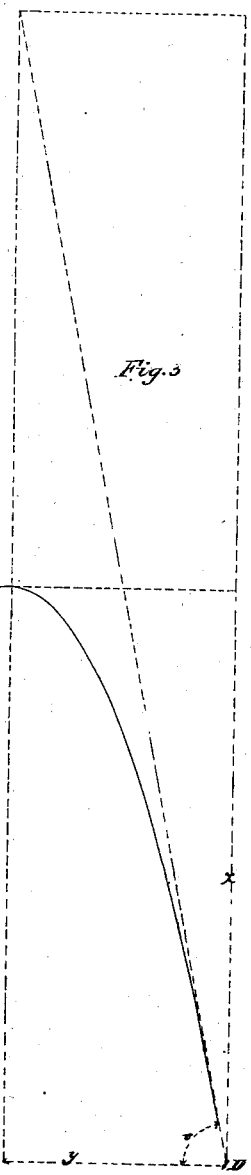

In a parabola (see Fig. 3) of which $x$ is the abscissa and $y$ the ordinate at a point D, we have $$\tan. v = \frac{2x}{y}$$

by equation (4)

$$\tan. v = \frac{2rn^2}{5840}$$

and by substituting this value of tan. $v$ in the preceding equation $$\frac{2x}{y} = \frac{2rn^2}{5840}, \text{ and } x = \frac{ryn^2}{5840} \quad (5)$$

By the formula of the parabola $$x = \frac{y^2}{p} \quad (6)$$

$p$ denoting the parameter and $$p = \frac{y^2}{x} \quad (7)$$

then if $y$ be equal to the radius $r$, equations 5, 6, and 7, become $$x = \frac{ryn^2}{5840} = \frac{r^2 n^2}{5840}$$

$$p = \frac{y^2}{x} = \frac{r^2}{x} = \frac{r^2}{\left(\frac{r^2 n^2}{5840}\right)} = \frac{5840}{n^2}$$

$$x = \frac{y^2}{p} = \frac{r^2}{p} = w°.$$

but in a circle $$r = \frac{180°}{\pi}$$

and hence $$w° = \frac{r^2}{p} = \frac{r\frac{180}{\pi°}}{p} = \frac{180r}{\pi p} = \frac{180r}{\pi\left(\frac{5840}{n^2}\right)} = \frac{180rn^2}{\pi 5840}$$

and by replacing $\pi$ by its value (3.1416) we obtain $$w° = \frac{180rn^2}{18347} = \frac{rn^2}{102} \quad \text{(Rule 2)}$$

which equation represents a rule for determining the angle of the sector of the circle in which the curve of the propeller blade is contained, and which may be thus expressed in words: Multiply the number of revolutions of the propeller per minute by itself and by the radius of the propeller in feet, divide the product by 102, the quotient will be the angle in degrees of the sector in which the curve of the propeller blade is described.

As the curve is a regular spiral it is described by dividing the arc $w$ (Fig. 2) into a number of equal parts, 8 for example, and numbering them in regular succession from one extremity, D, of the arc to the other, E; then divide the radius E A of the propeller into the same number of equal parts (8) and number them in regular succession from the circumference E to the center A; through the divisions 1, 2, 3 &c., of the arc $w$ draw the radii $y'$, $y''$, $y'''$ &c., and through the divisions of the radius E A, with the axis A of the propeller as a center, draw the circular arcs $x'$, $x''$, $x'''$, &c. Unite the points of intersection $e'$ $e''$ $e'''$ &c. of the arcs $x'$ $x''$ $x'''$ with their respective radii $y'$ $y''$ $y'''$ by a curved line which will be the spiral curve required in the blade of the propeller moving in the direction indicated by the arrow with $n$ revolutions per minute, to counterbalance the tendency of the water to move outward from the axis of the propeller under the influence of the centrifugal force generated by the rotation. This curve is not influenced by the obliquity of the propeller blade to its axis or by what is generally termed its pitch which may be adjusted to the power of the engine and to the vessel. As however the water is discharged by my propeller in directions parallel with its axis, the pitch may be greater with it than with those constructed by the ordinary rules; and consequently the propeller may be driven slower to produce the same velocity in the vessel.

As the power of the engine and the form and dimensions of the vessel are different in every instance no definite rule can be made to determine the pitch, but when this is taken at some fixed number of feet I obtain the breadth of the propeller and the number of blades from it by the following formula:

$$\text{Breadth or B} = \frac{\text{pitch } 4r}{2} \quad \text{(Rule 3)}$$

$$\text{Number of blades or } m = \frac{2 \text{ pitch}}{\text{pitch } 4r} \quad \text{(Rule 4)}$$

Figure 4:

Again by referring to Fig. 4 where the line $fg$ represents the direction of the blade at the circumference of the propeller, making the angle V with the axis, we have $$\tan V = \frac{\sin V}{\cos V}$$

but in this instance $$\sin V = H = \frac{2\pi r}{m}, \text{ and } \cos V = B;$$

hence $$\tan V = \frac{\left(\frac{2\pi r}{m}\right)}{B} = \frac{2\pi r}{mB} \quad \text{(Rule 5)}$$

$$B = \frac{2\pi r}{m \tan V} \quad \text{(Rule 6)}$$

$$m = \frac{2\pi r}{B \tan V} \quad \text{(Rule 7)}$$

which last two formulas represent two more rules for calculating the breadth and number of blades when the angle which the propeller blade at its circumference makes with the axis is known.

In order to exemplify the manner in which these rules are applied in practice, let it be required to determine the proper inclination of the blade, the breadth, and the number of blades of a propeller of thirty feet pitch twelve feet in diameter, making fifty revolutions per minute. In this example $$r = \frac{12}{2} = 6; \text{ pitch} = 30; \; n = 50$$

by rule 1 we have $$\tan v = \frac{2rn^2}{5870} = \frac{12 \times 50^2}{5870} = \frac{12 \times 2500}{5870} = \frac{30600}{5870} = 5.16$$

by referring to a table of tangents this is found to be the tangent of 79° nearly.

By rule 2 we obtain the angle of the sector which contains the curve of the blade $$w° = \frac{rn^2}{102} = \frac{6 \times 2500}{102} = 147°$$

from which the blade is described by the directions given in the paragraph immediately following rule 2.

By rules 3, 4 and 5 we have $$B = \frac{\text{pitch } 4r}{2} = \frac{30 - 24}{2} = 3 \text{ feet}$$

$$m = \frac{2 \text{ pitch}}{\text{pitch } 4r} = \frac{60}{30 - 24} = 10 \text{ blades}$$

$$\tan V = \frac{2\pi r}{mB} = \frac{2 \times 3.1416 \times 6}{10 \times 3} = 1.2566$$

which corresponds to 51°, 30′, nearly.

Figure 5:
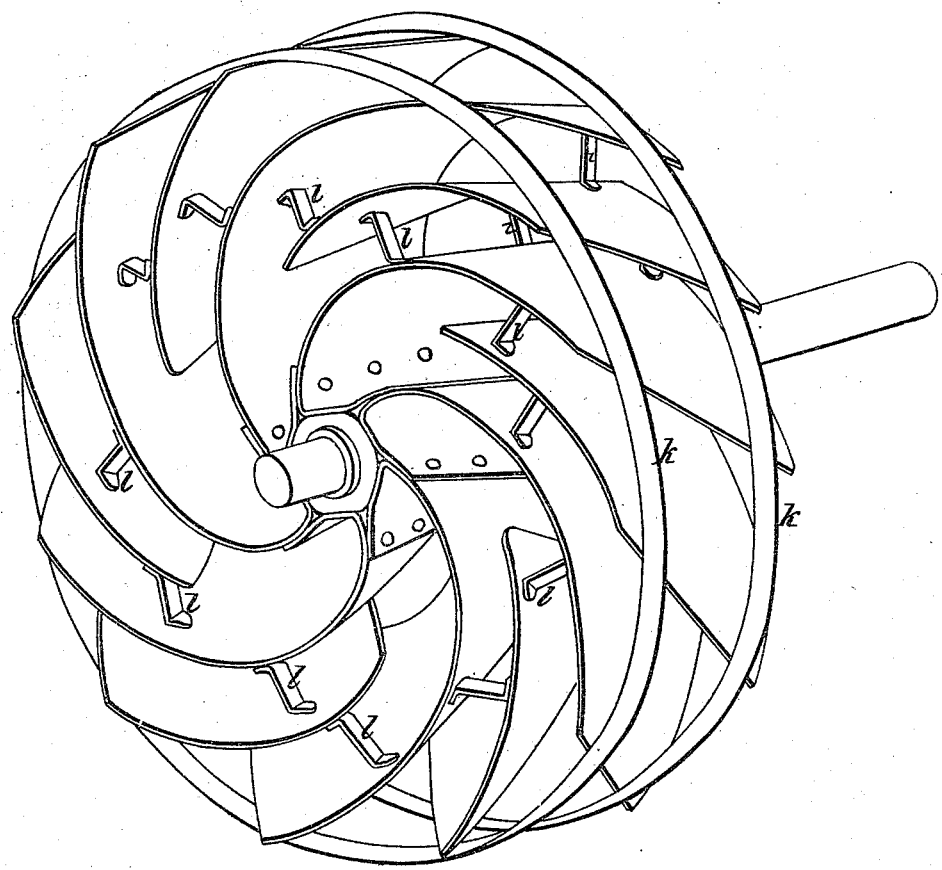

In constructing my centripetal propeller I connect the outer extremities of the blades by hoops $k, k,$ which add greatly to their strength; and in large propellers where the breadth is small in proportion to the diameter and in which consequently a greater number of blades is necessary. I do not continue all the blades to the shaft but remove the inner part of a portion of them, as in Figs. 4 and 5, and connect the outer parts with the adjacent blades by stays $l, l$. The propeller thus described may be made of such materials as the constructor may deem most expedient.

I have thus given all the necessary directions to enable one skilled in the art to determine the curve of centripetal propeller blades which shall counteract the centrifugal force, the advantages incident to this construction are: First, the propeller delivers the water as solidly as it receives it, and hence it can act with greater advantage to propel the vessel; second, the vessel is more easily steered as the rudder acts in a comparatively unbroken mass of water instead of in conflicting currents, as is the case where the water is deflected by the action of the centrifugal force generated by the rotation of the propeller; third, this propeller admits of slow motion and therefore may be attached directly to the crank shaft of the engine thus doing away with the inconveniences and loss of power incident to the use of cog gearing or other mechanical devices used to increase the speed of the propeller beyond that of the crank shaft.

I am aware that propellers have been constructed with their blades curved to their radii, and that the curved side of the blade has been formed to grasp the water and to a certain extent prevent its deflection by the centrifugal force, but such curved blades have not been constructed on the principle herein set forth, and do not attain the proposed result.

What I claim therefore as my invention and desire to secure by Letters Patent is—

The peculiar curve given to the propeller blades as herein set forth to counteract the tendency of the centrifugal force to deflect the issuing water obliquely to the axis of the propeller.

In testimony whereof I have hereunto subscribed my name.

JOHN WILLIAM NYSTROM.

Witnesses:
E. S. RENWICK,
P. H. WATSON.